United States Patent [19]

Uroshevich

[11] 4,276,873

[45] Jul. 7, 1981

[54] REFLECTORS FOR SOLAR ENERGY COLLECTORS

[75] Inventor: Miroslav Uroshevich, Cincinnati, Ohio

[73] Assignee: Alpha Solarco Inc., Cincinnati, Ohio

[21] Appl. No.: 52,090

[22] Filed: Jun. 25, 1979

[51] Int. Cl.³ ............................................. F24J 3/02
[52] U.S. Cl. .................................... 126/438; 52/630
[58] Field of Search ............... 126/450, 449, 432, 439, 126/438; 52/630

[56] References Cited

U.S. PATENT DOCUMENTS

| 1,707,339 | 4/1929 | Small | 52/630 |
| 3,049,055 | 8/1962 | Tubbs | 126/438 |
| 3,696,578 | 10/1972 | Swenson | 52/630 |
| 3,824,664 | 7/1974 | Seeff | 52/630 |
| 3,841,738 | 10/1974 | Caplan | 126/438 |
| 4,164,934 | 8/1979 | Anderson | 126/438 |
| 4,168,696 | 9/1979 | Kelly | 126/438 |
| 4,173,397 | 11/1979 | Simpson | 126/438 |

*Primary Examiner*—Samuel Scott
*Assistant Examiner*—G. Anderson
*Attorney, Agent, or Firm*—Gary M. Gron

[57] ABSTRACT

The disclosure illustrates an improved reflector for a solar energy collector. The reflector is made up of a thin, vacuum formed, elongated, trough like sheet having a reflective parabolic surface for reflecting and focusing solar radiation. A structural sheet conforms to and supports the thin sheet. The structural sheet has a series of integrally formed depressions extending away from the thin sheet to form elongated reinforcing ribs.

3 Claims, 4 Drawing Figures

REFLECTORS FOR SOLAR ENERGY COLLECTORS

The present invention relates to solar energy collectors of the focusing kind and more specifically to reflector elements for such collectors.

One of the key elements in a focusing collector is the reflector element. This is the component that reflects and focuses the beam component of solar radiation on to a receiver, thereby greatly increasing the heat energy that may be obtained from solar radiation.

Reflectors may take the form of one piece trough like elements as shown in U.S. Pat. No. 4,098,264. Generally, this type of reflector is made out of a thin sheet of material to enable mass production manufacture. The thin sheet, while solving one problem, introduces another. That problem is sagging of the sheet which radically changes the optical characteristics of the reflector. The reason for this is that the unsupported span of the sheet is quite great in most collectors and it is not capable of self support. The sagging moves the optical focal line from the axis of the receiver, thereby failing to concentrate the maximum solar energy on the receiver.

It has been suggested in some patents, namely, U.S. Pat. No. 4,136,673 to reinforce the reflective sheet. However, this reinforcement tends to be elaborate and expensive.

In accordance with the present invention, the above problems are solved in a solar energy collector by a reflector comprising a relatively thin vacuum formed sheet which defines a concave reflective surface for reflecting and focusing the beam component of solar radiation. An elongated structural sheet conforms to and supports the relatively thin sheet. The structural sheet has a plurality of integral depressions facing away from the thin sheet to form elongated raised ribs on the exterior of said structural sheet for stiffening it.

The above and other related features of the present invention will be apparent from a reading of the following description of the disclosure shown in the accompanying drawings and the novelty thereof pointed out in the appended claims:

Figure 1:
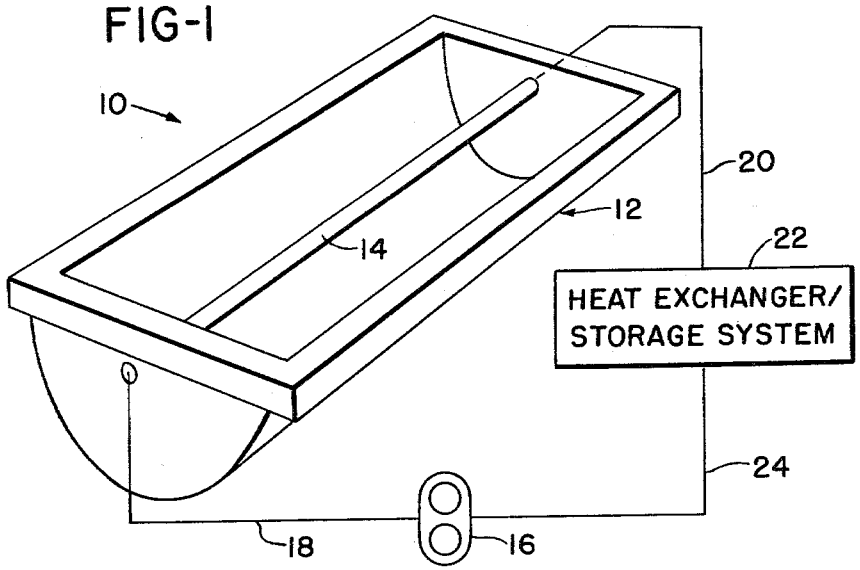
FIG. 1 illustrates a perspective view of a solar energy collector having a reflector which embodys the present invention.

Referring to FIG. 1 there is shown a solar energy collector 10 comprising a reflector assembly 12, to be described below, which receives the beam component of solar radiation and reflects and focuses it along a focus line that is substantially coaxial with an elongated tubular receiver 14.

Receiver 14 absorbs solar energy and in turn heats up heat transfer fluid which passes through it. A pump 16 pressurizes the fluid for flow through a conduit 18, receiver 14, and a conduit 20 to a heat exchanger/storage system generally indicated at 22. A conduit 24 completes the loop between heat exchanger/storage system 22 and the pump 16.

The reflector 12 is an optical device that relies on geometric stability to keep the reflected solar energy concentrated on the receiver 14. In its preferred form reflector 12 has a parabolic shape which focuses all parallel solar rays onto a single line. In accordance with the present invention reflector 12 is structurally supported to maintain the desired geometric stability.

Figure 3:
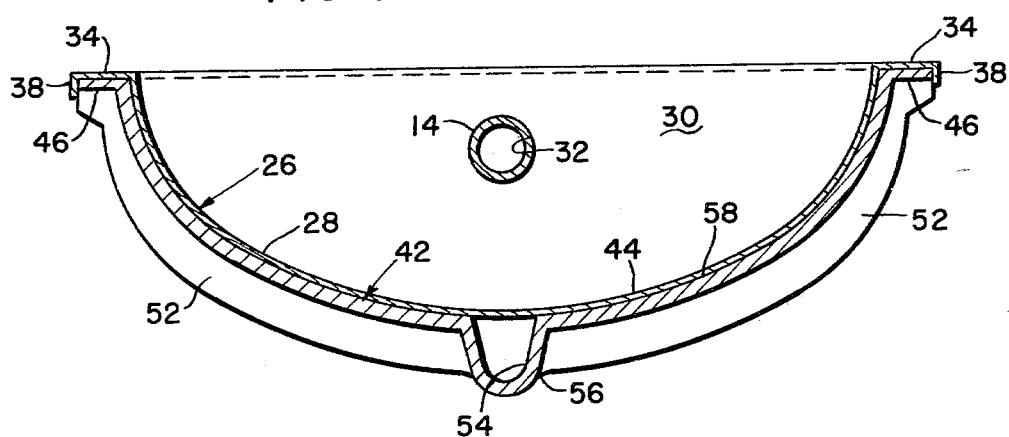
FIG. 3 is a cross-sectional view of the reflector of FIG. 2 taken on line 3—3 of FIG. 2.
Figure 2:
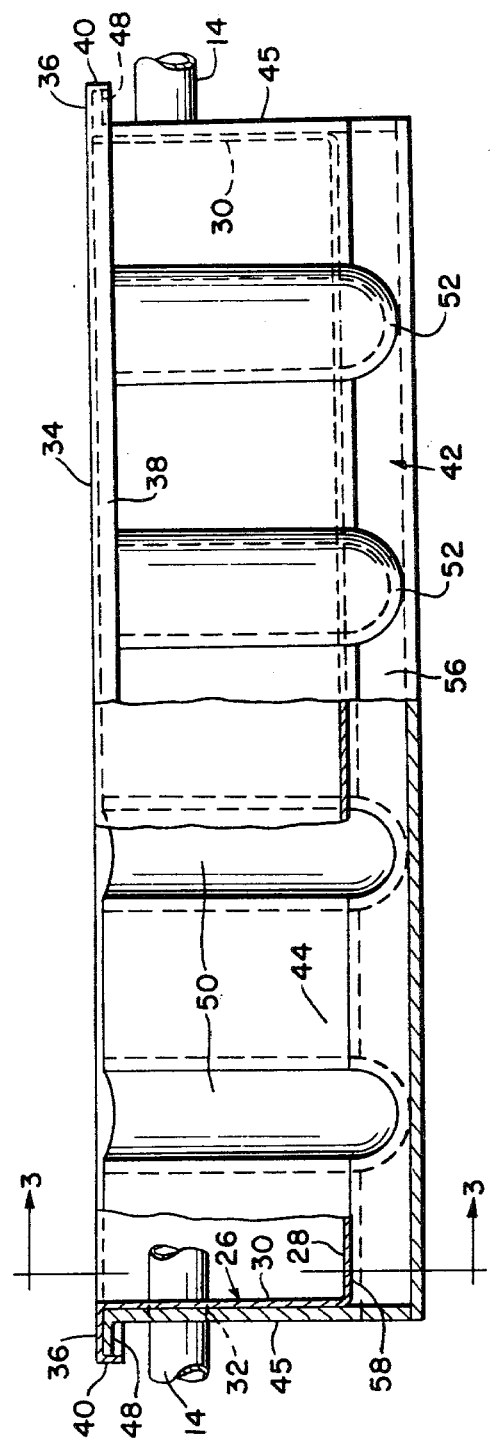
FIG. 2 is a longitudinal section view of the reflector shown in FIG. 1.

Referring to FIGS. 2 and 3 the reflector comprises a relatively thin elongated sheet 26 formed to define a concave reflective surface 28, preferably having a uniform parabolic cross section shape as particularly shown in FIG. 3. Sheet 26 has integral end walls 30 which have holes 32 through which receiver 14 extends. An integral perimeter flange is formed from longitudinal flanges 34 and end flanges 36. A perimeter wall extends from the perimeter flange and is formed from longitudinal sections 38 and end sections 40.

Preferably, element 26 is vacuum formed from a suitable material such as aluminum that either is reflective or has the capability to support a reflective surface. To lower manufacturing costs and readily permit vacuum forming, the element 26 is made from as thin a material as possible.

A structural sheet 42 comprises an elongated concave section 44 conforming to and supporting the exterior of sheet 26. Sheet 42 has integral end walls 45 and a perimeter flange comprised of longitudinal portions 46 and end portions 48. The perimeter flanges of sheet 26 and 42 abut when the unit is assembled.

A plurality of depressions 50 are formed in section 44 so that they extend away from the sheet 26 to form elongated integral ribs 52 that reinforce sheet 26. As illustrated, the ribs 52 extend in a direction that is normal to the longitudinal axis of the sheet 42. In addition, a longitudinal depression 54 extends the length of sheet 42 interconnecting depressions 50 to form a longitudinal rib 56.

The thin sheet 26 and structural sheet 42 are preferably secured using a suitable adhesive 58.

Figure 4:
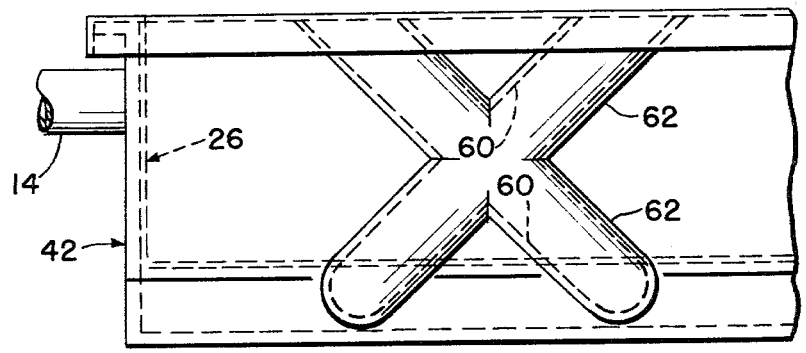
FIG. 4 is an exterior longitudinal view of an alternate embodyment of the present invention.

FIG. 4 shows an alternative configuration for the depressions and ribs. In this figure a relatively thin sheet 26, as in FIGS. 2 and 3, is supported by a structural sheet 44 that has a plurality of depressions 60 facing away from sheet 26 to form elongated ribs 62. As is apparent from FIG. 4, ribs 62 extend in a direction that is not at right angles with respect to the longitudinal axis of sheet 44. In fact the plane of the ribs is at 45° with respect to the axis and cross one another to form a truss like structure.

In both cases the integral ribs support the structural sheet 44 from longitudinal sagging as well as twisting. This result is accomplished with substantially no increase in weight and minimal increase in manufacturing costs.

Although several preferred embodyments of the present invention have been described it should be apparent to those skilled in the art that it may be practiced in other forms without departing from the spirit and scope thereof.

Having thus described the invention what is claimed as novel and desired to be secured by Letters Patent of the United States is:

1. In a focusing solar energy collector, a reflector assembly comprising:

an elongated, relatively thin, vacuum formed sheet defining a reflective surface having a uniform parabolic cross sectional configuration and integral end walls forming a trough like element for reflecting and focusing the beam component of solar radiation, said thin sheet having an integral perimeter flange and a perimeter wall extending at a right angle to said perimeter flange;

an elongated structural sheet conforming to and supporting the thin sheet, said structural sheet having integral end walls to form a trough like element into which said thin sheet is nestled and an integral perimeter flange abutting said perimeter flange of said thin sheet, said perimeter wall of said thin sheet being positioned to extend over said perimeter flange of said structural sheet, said structural sheet further having an integral depression extending away from said thin sheet to form an elongated central rib and a plurality of integral depressions extending away from the thin sheet to form raised elongated ribs connecting with said central rib and extending to said perimeter flange of said structural sheet for stiffening said structural sheet.

2. Apparatus as in claim 1 further comprising an adhesive between said thin and said structural sheets.

3. Apparatus as in claim 1 wherein said integral depressions extend in a direction normal to the longitudinal axis of said structural sheet.

* * * * *